United States Patent
Williams et al.

(10) Patent No.: US 11,370,599 B2
(45) Date of Patent: Jun. 28, 2022

(54) DISPENSERS AND METHODS OF USE THEREOF FOR DISPENSING SOLID MOSQUITO LARVICIDES AND OTHER MATERIALS OF INTEREST

(71) Applicant: Rutgers, The State University of New Jersey, New Brunswick, NJ (US)

(72) Inventors: Gregory M. Williams, Milltown, NJ (US); Randy Gaugler, North Brunswick, NJ (US)

(73) Assignee: Rutgers, The State University of New Jersey, New Brunswick, NJ (US)

(*) Notice: Subject to any disclaimer, the term of this patent is extended or adjusted under 35 U.S.C. 154(b) by 299 days.

(21) Appl. No.: 16/677,741

(22) Filed: Nov. 8, 2019

(65) Prior Publication Data
US 2020/0095051 A1    Mar. 26, 2020

Related U.S. Application Data

(62) Division of application No. 15/261,235, filed on Sep. 9, 2016, now Pat. No. 10,499,628.

(60) Provisional application No. 62/313,679, filed on Mar. 25, 2016.

(51) Int. Cl.
A01M 25/00     (2006.01)
B65D 83/04     (2006.01)
A01M 1/20      (2006.01)

(52) U.S. Cl.
CPC ....... *B65D 83/0409* (2013.01); *A01M 1/2016* (2013.01); *A01M 25/006* (2013.01); *B64C 2201/128* (2013.01)

(58) Field of Classification Search
CPC .................. A01M 25/006; B64C 2201/128
See application file for complete search history.

(56) References Cited

U.S. PATENT DOCUMENTS

| | | | |
|---|---|---|---|
| 9,505,496 B2* | 11/2016 | Markov | B64D 1/12 |
| 2008/0203107 A1* | 8/2008 | Conley | G07F 11/16 221/1 |
| 2012/0246998 A1* | 10/2012 | Vasudeva | F21V 33/004 43/114 |
| 2015/0336118 A1* | 11/2015 | Myers | A01M 25/006 239/684 |
| 2017/0144759 A1 | 5/2017 | Chiu | |

FOREIGN PATENT DOCUMENTS

| | | | | |
|---|---|---|---|---|
| CN | 202863767 U | 4/2013 | | |
| FR | 3071482 A1 * | 3/2019 | ......... | A01M 7/0042 |

* cited by examiner

*Primary Examiner* — Jessica B Wong
(74) *Attorney, Agent, or Firm* — William Bak; Kathleen D. Rigaut

(57) ABSTRACT

Dispenser devices suitable for use on unmanned aerial vehicles are described having utility for dispensing solid larvicides to difficult to reach insect habitats.

6 Claims, 8 Drawing Sheets

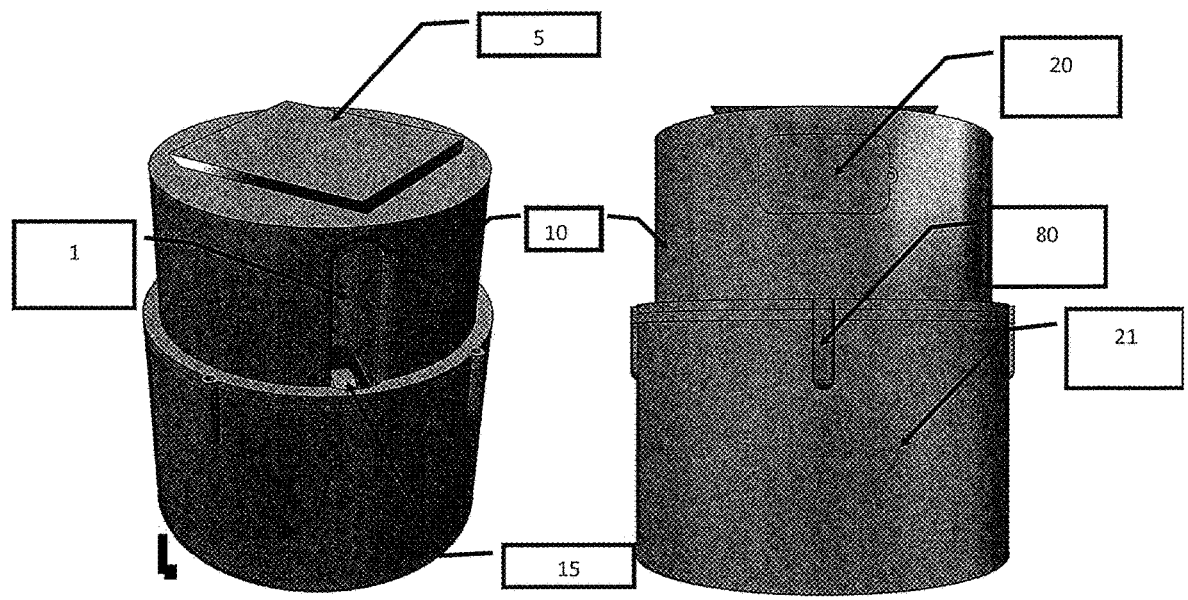
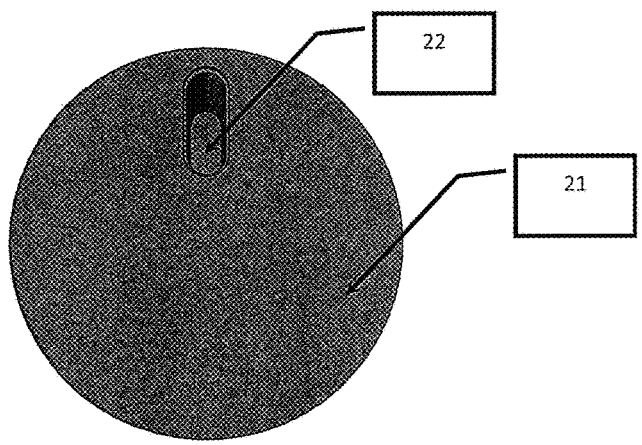
FIG. 1A  FIG. 1B
FIG. 1C

DISPENSERS AND METHODS OF USE THEREOF FOR DISPENSING SOLID MOSQUITO LARVICIDES AND OTHER MATERIALS OF INTEREST

CROSS REFERENCE TO RELATED APPLICATION

This application is a divisional of co-pending U.S. application Ser. No. 15/261,235, filed Sep. 9, 2016, which claims the benefit under 35 USC § 119(e) of U.S. Provisional Application No. 62/313,679 filed Mar. 25, 2016, the entire disclosure being incorporated herein as though set forth in full.

FIELD OF THE INVENTION

This invention relates to the fields of pest control and use of unmanned aerial systems (UAS) to dispense tablets or briquettes to a location of interest. In preferred embodiment, the briquettes or tables comprise mosquito controlling and, or eradicating larvicides which are dispensed from uniquely adapted dispenser devices.

BACKGROUND OF THE INVENTION

Several publications and patent documents are cited throughout the specification in order to describe the state of the art to which this invention pertains. Each of these citations is incorporated herein by reference as though set forth in full.

Population growth and the expansion of urban areas have made modern mosquito control more challenging. Many areas that were once treated with larvicides by full-scale aircraft are now inaccessible for such applications. What were once large open expanses of marshland are now peppered with housing, cell phone towers, and hiking trails. The habitat that is left still produces mosquitoes but is too small or dangerous for traditional aerial treatments and inaccessible to ground applications. In addition, environmental restrictions and water quality standards call into question the practice of blanketing target areas with mosquito larvicides, when oftentimes only small pools within these areas produce mosquitoes.

The present invention addresses a number of the above identified drawbacks currently present which prevent or reduce effective mosquito control in affected areas.

SUMMARY OF THE INVENTION

In accordance with the present invention, a rotary dispenser device for releasing one or more aerially dispersed solid briquettes or pellets, at a location of interest is disclosed. An exemplary dispenser device comprises a mount for mounting said device onto an unmanned aerial system (UAS), a loading port for loading said briquettes or pellets, a lid, a base, said base having an exit port for egress of said briquette or pellet, said briquettes being loaded onto a carousel disposed within said dispenser, said dispenser comprising a control board for receiving a signal triggering release of said briquettes or pellets upon arrival of said at said location of interest, said signal causing a servo to advance the carousel over said exit port thereby releasing said briquettes at said location of interest. In a preferred embodiment, the control panel can be activated remotely. A particularly preferred device is shown in FIG. 1. In one embodiment, the briquettes or pellets comprise a larvicide which impairs mosquito breeding ability or is lethal to the mosquito. In another embodiment, other solid materials are aerially dispersed.

In another embodiment of the invention, a method for controlling insect or mosquito populations at locations of interest is provided. An exemplary method comprises filling the carousel within the rotary dispenser device described above with one or more briquettes comprising a larvicide which impairs mosquito breeding ability or kills the mosquito, mounting the dispenser onto an unmanned aerial system, flying the UAS to a location of interest and activating the control panel causing the servo to advance the carousel causing briquettes to fall out of said exit port at the location of interest.

In another aspect of the invention, a linear dispenser device for releasing one or more solid briquettes or tablets at a location of interest is provided. A linear dispenser device comprises a body with supporting arms connected to means (e.g., clips, wire ties, etc.) for mounting said body onto legs of an unmanned aerial system, said body comprising a lid, a hopper for loading said briquettes or tablets, a charge port, indicator lights, an on/off switch, a wire hole, a separate opaque light cover suitable for replacing a clear lens on said UAS and a light sensor suitable for positioning directly below front lights on said UAS, wherein the light sensor detects when the front lights of the are on or off, wherein signals from the light sensor are sent to a control board comprising software for operation of the UAS, wherein when the light is turned off, a control board signals a servo attached to a servo arm to swing a shuttle back allowing a tablet to drop from the hopper, wherein switching the light back on moves the shuttle forward, pushing the tablet out of the mouth of the unit, thereby releasing said briquette or tablet at said location of interest. In another embodiment, this order can be reversed, and turning on the switch on signals a servo attached to a servo arm to swing a shuttle back allowing a tablet to drop from the hopper, wherein switching the light back off moves the shuttle forward, pushing the tablet out of the mouth of the unit, thereby releasing said briquette or tablet at said location of interest An exemplary linear dispenser device is provided in FIG. 2. In a particularly preferred embodiment, the briquettes or tablets comprise a larvicide which impairs mosquito breeding ability or is lethal to the mosquito.

The invention also provides a method for controlling insect or mosquito populations at locations of interest using the linear dispenser device described above. An exemplary method entails filling a hopper within the linear dispenser device with one or more briquettes comprising a larvicide, mounting said linear dispenser device to an UAS via said clips, flying said UAS to said location of interest and activating said control panel by turning the lights of the UAS on and off, thereby sending a signal to the control board, wherein when the light is turned off, said control board signals a servo attached to a servo arm to swing a shuttle back allowing a tablet to drop from the hopper, wherein switching the light back on moves the shuttle forward, pushing the tablet out of the mouth of the device, thereby releasing said briquette or tablet at said location of interest.

In yet another embodiment, a wiring system for controlling any auxiliary device attached to a quadcopter is provided. The wiring system comprises a light sensor wired to a control board which is wired to both a power board and a servo with the power board also being wired to a battery (preferably a rechargeable battery) along with a light cover which covers a lens on the quadcopter. The system is operated by way of the light sensor. The light sensor detects when the front lights of the Phantom are turned on or off using the remote control provided with the UAS. Signals from the light sensor are sent to the control board which runs the software that controls the UAS. When the light is turned off, the control board signals the servo to swing the shuttle back allowing a tablet to drop from the hopper. When the light is turned back on, the shuttle moves forward pushing the tablet out of the mouth of the unit. As mentioned above, this order can also be readily reversed.

The opaque light cover replaces the clear lens on the Phantom and positions the light sensor directly below one of the front lights. In an alternative embodiment, rather than replacing the lens, the light cover surrounds the lens eliminating the need to remove it.

BRIEF DESCRIPTION OF THE DRAWINGS

FIGS. 1A-1D show different views of the rotary dispenser device for delivering the larvicide containing briquettes of the invention. FIG. 1A shows the front view where the loading port (1), the mount to the unmanned aerial device (5), the lid (10) and the briquette (15) are shown. FIG. 1B depicts a rear view showing the battery cover (20). FIG. 1C shows the bottom view of the device. FIG. 1D is an exploded view of the device of the invention showing the loading port (1), the mount (5), lid (10), battery (25), pawl (30), servo (35), control board (40), cover (45), ratchet (50), arm (55), briquette (15), carousel (60), chamber (65), lightening holes (70), base (21) and screw holes (80).

FIG. 2A shows the front side view showing the clip (90) for attaching the device to the UAS, indicator lights (95) and on/off switch (100). FIG. 2B shows the rear view showing the charge port (105) and an arm (110) of the device. A stack of solid briquettes or tablets (115) in the hopper (120) is also shown.

FIG. 4A shows a rear portion of the quadcopter (shown in full in FIG. 4C) with the linear dispenser device mounted to the rear legs of the quadcopter. FIG. 4B. shows the clips and ties of the linear dispenser device used to secure the linear dispenser device to the rear legs of the quadcopter shown in FIG. 4A. FIG. 4C is a side perspective view of the quadcopter with the linear dispenser device mounted to the rear legs of the quadcopter as shown in FIG. 4A. FIG. 4D is a perspective view of an underside of one of the front propellers of the quadcopter shown in FIG. 4C showing the wiring system that enables the operator to release tablets or briquettes from the linear dispenser device by turning the front lights of the quadcopter on and off. FIG. 4E is a top perspective view of the linear dispenser device of FIG. 4C with the lid removed showing the electronic components contained therein and the wiring extending therefrom.

DETAILED DESCRIPTION OF THE INVENTION

Figure 1D:
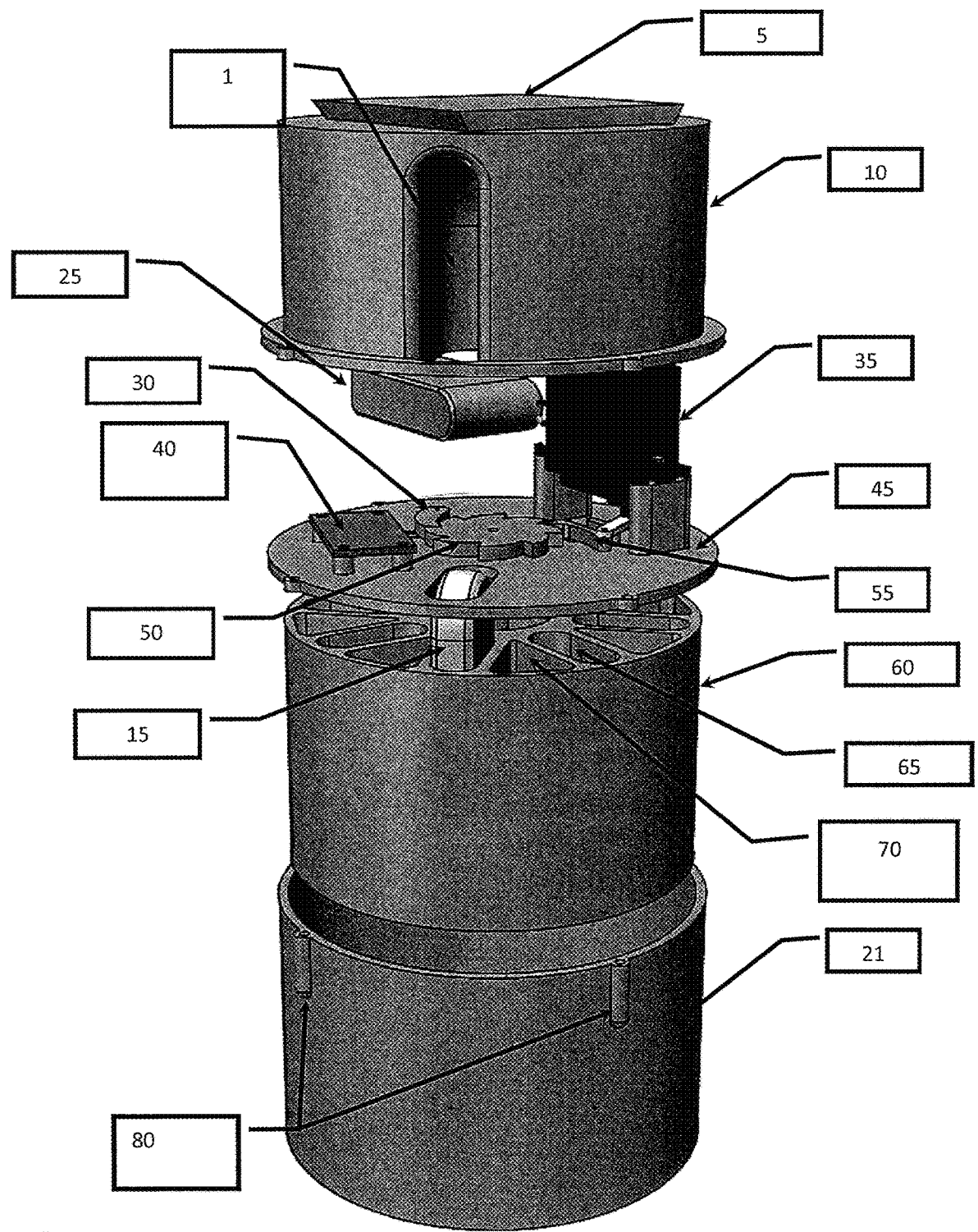

Unmanned aerial systems (UAS) offer access to these restricted areas. Aerial pest control with full-scale aircraft is dangerous and crashes are not uncommon. The small size and weight of UAS reduce the risks of property damage or personal injury in the event of a crash. Additionally, onboard sensors and computers allow for completely autonomous flight reducing the need for extensive training and skilled pilots. And, of course, UAS are significantly less expensive the full-scale aircraft. UAS are ideally suited for the precision application of pesticides to small or sensitive areas. Granular or briquette formulations allow for precise application providing long residual efficacy against pest insects.

This invention provides two dispenser devices for dispensing mosquito control tablets or briquettes by UAS. The rotary dispenser device consists of a carousel which holds a number of briquettes. When activated, a servo advances the carousel causing one briquette to fall out of an opening in the bottom of the housing. The mechanism can be activated manually by remote control or tied into the flight control system of the UAS for automatic activation by GPS coordinates. The linear dispenser device comprises a body which attaches by clips that snap onto the landing legs of the UAS, a body comprising a lid and a hopper, a battery, a light sensor, a light cover, a power board and a control board, wherein the light sensor detects when the front lights of the UAS are on or off, wherein signals from the light sensor are sent to a control board comprising software for operation of the UAS, wherein when the light is turned off, the control board signals a servo to swing a shuttle back allowing a tablet to drop from the hopper, wherein switching the light back on moves the shuttle forward, pushing the tablet out of the mouth of the unit, thereby releasing said briquette or tablet at said location of interest.

The invention was specifically designed to deliver solid briquettes containing mosquito larvicides to water bodies. However, the invention could be adapted to drop other small payloads such as packages, candy drops (popular at remote aircraft events, site markers, beneficial insect releases, etc.). The dispenser is made of lightweight materials (e.g., plastics, light metals, etc.) to increase flying distance by reducing weight loads.

The invention also provides a wiring system for controlling any auxiliary device attached to a quadcopter is provided. The wiring system comprises a light sensor wired to a control board which is wired to both a power board and a servo with the power board also being wired to a battery (preferably a rechargeable battery) along with a light cover which covers a lens on the quadcopter. The system is operated by way of the light sensor. While release of larvicide tablets is disclosed herein, the light sensor system could be used to release any item from the quadcopter such as a life preserver for example. In this embodiment, the servo could be replaced with a claw that opens and closes to release the material, e.g., the life preserver.

This invention offers several advantages over traditional methods of dispersing mosquito control briquettes. UAS are less expensive to purchase, fly and maintain and have less hazard potential than full scale aircraft. UAS provide an aerial option when full scale aircraft are not available or in areas where they cannot fly. With this invention, mosquito briquettes can be dispersed more quickly and more accurately in terms of application rate and application location than hand applications. The present invention also facilitates delivery to remote areas that are inaccessible from the ground.

The present invention was designed specifically for multi-rotor aircraft, preferably for delivery of mosquito control briquettes. Moreover, the dispensers of the invention offer the ability to carry and disperse multiple payloads whereas other devices only drop one.

Definitions

An "unmanned aerial system (UAS)", commonly known as a drone, as an unmanned aircraft system (UAS), and also referred by several other names, is an aircraft without a human pilot aboard. The flight of the UAS may be controlled with various kinds of autonomy: either by a given degree of remote control from an operator, located on the ground or in another vehicle, or fully autonomously, by onboard computers. Many different UAS are available and can be purchased commercially on Amazon.com. See for example, DJI Phantom 4 with 4K video, DJI Inspire 1 Quadcopter v2.0, DJI Phantom 3 Standard with 2.7K Video and 3D Robotics X8-M Mapping Quadcopter, 915 mhz 3DR0124. The terms UAS and quadcopter are used interchangeably herein.

The term "insect" as used herein means an arthropod in the class Insecta, characterized by six legs, up to four wings, and a chitinous exoskeleton. Mosquito habitats of *Aedes albopictus, Anopheles quadrimaculatus* and *Culex molestus* are preferably targeted using the UAS of the invention.

The term "site of application" as used herein refers to the location comprising the target insect species.

"Solid larvicides" are commercially available and include, without limitation, Altosid XR-Briquets, Natular XRG, Natular T30, Summit Mosquito Dunks, Fourstar Briquets, Biopren® 4GR Mosquito Larvicide, Summit 20 pack Mosquito Dunk, Altosid Pro-G Mosquito Larvicide, Mosquito Control by ChemTech LTD, and Pre-strike Mosquito Torpedos.

The following examples are provided to illustrate certain embodiments of the invention. They are not intended to limit the invention in any way.

Example I

Rotary Dispenser Device and Use Thereof

Mosquitos are carriers of several disease causing pathogens. Some of the common diseases transmitted by mosquitos include malaria, dengue, filariasis, West Nile virus, chikungunya, yellow fever, and Zika fever. More than half billion people get sick from mosquito borne illnesses every year resulting in nearly one million deaths. Accordingly, it is more critical than ever to develop new methods for mosquito control delivery means effective to target remote and previously inaccessible habitats.

In this example, a rotary dispenser device for delivering solid mosquito control tablets or briquettes is described using an unmanned aerial system (UAS). The device consists of a carousel which holds a number of briquettes. When activated a servo advances the carousel causing one briquette to fall out of an opening in the bottom of the housing. The mechanism can be activated manually by remote control or tied into the flight control system of the UAS for automatic activation by GPS coordinates. See FIGS. 1A-1D.

Figure 1E:
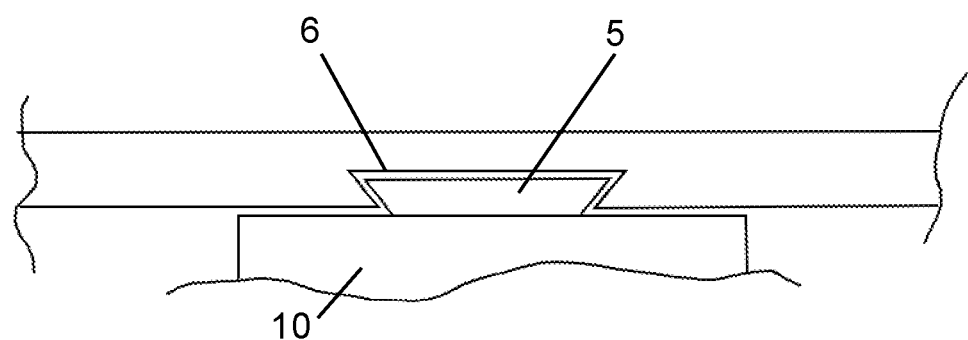
FIG. 1E shows an upper section of the lid (10) of the rotary dispenser device having an integrated dovetail mount (5) on top of the lid (10) that allows the rotary dispenser device to be quickly attached or removed to a corresponding mount (6) on the UAS. Thus, in use, the rotary dispenser device is attached to the UAS by sliding the mount (5) into the corresponding mount (6) on the UAS.
Figure 2A:
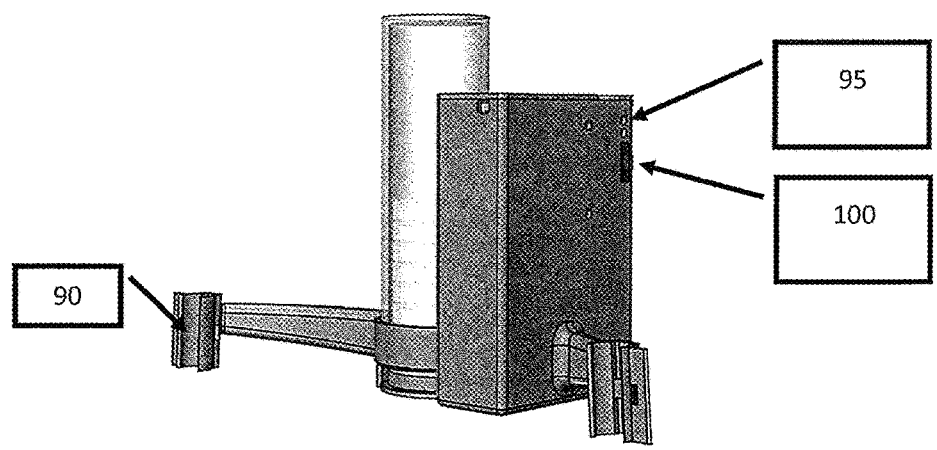
FIGS. 2A-2D show different views of the linear dispenser device for delivering the larvicide containing briquettes of the invention.
Figure 2B:
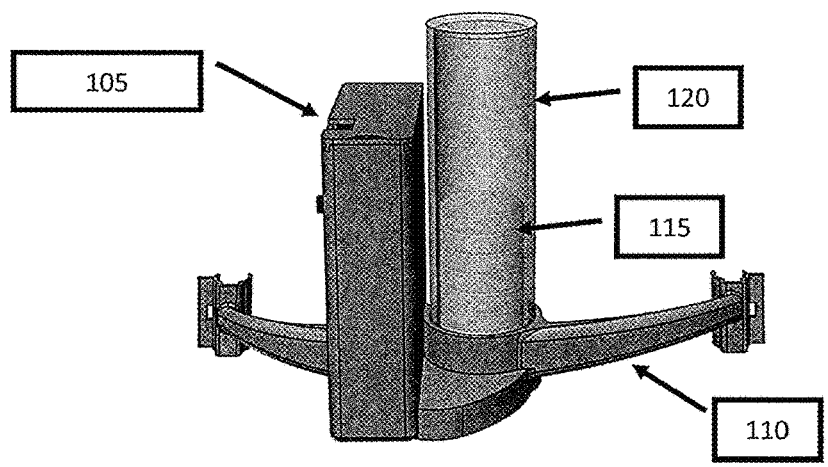
Figure 2C:
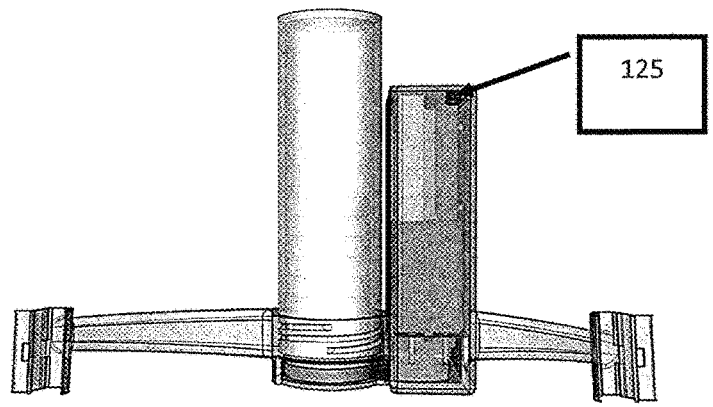
Figure 2D:
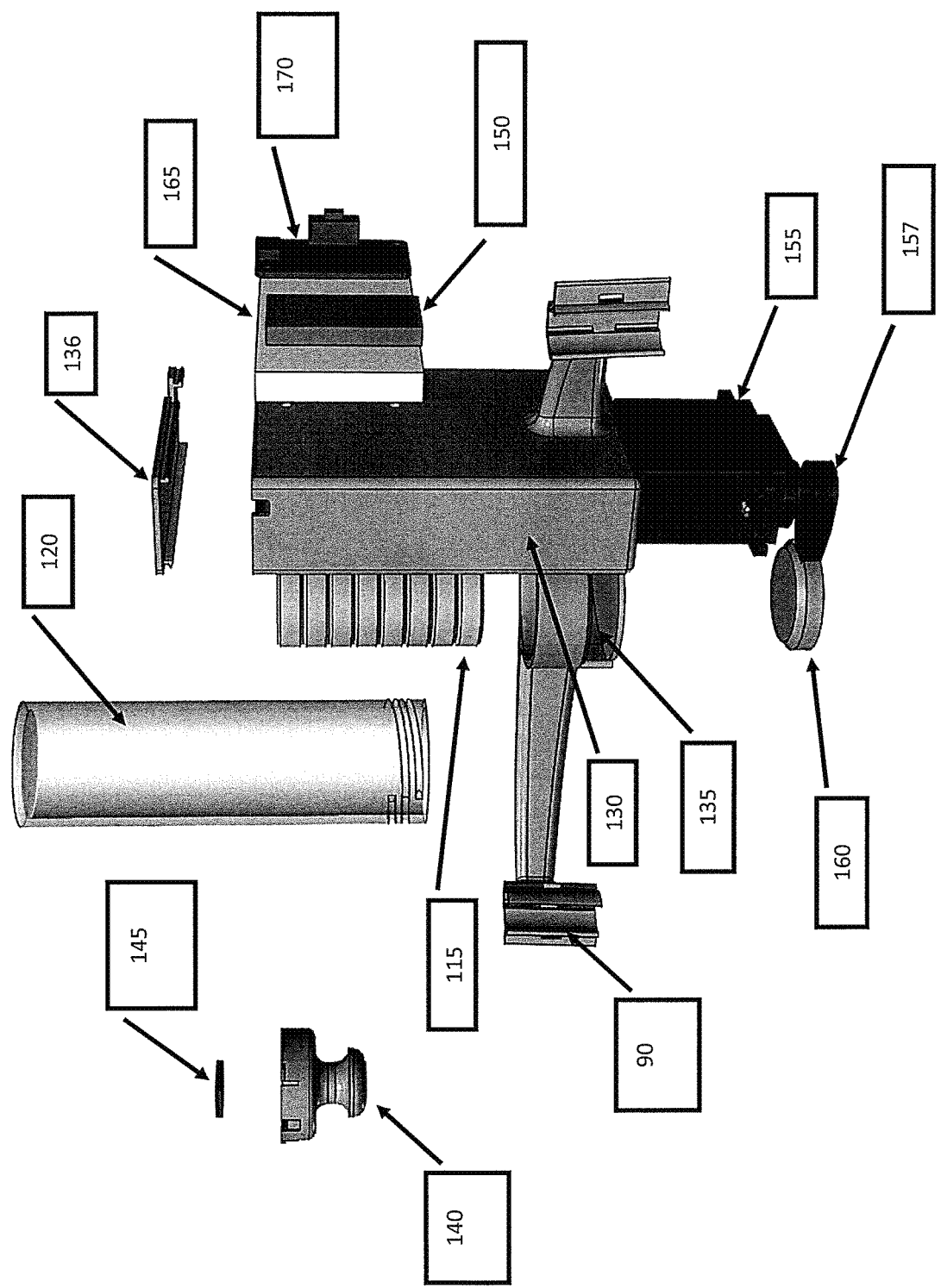

The housing is comprised of a lid (10) and base (21). The lid has an integrated dovetail mount (5) on top that allows it to be quickly attached or removed to a corresponding mount (6) on the UAS. See FIG. 1E. There is a loading port (1) on the side where the briquettes (15) are inserted into the carousel (60) one at a time. The battery housing is molded into the lid (10) and there is a tabbed battery cover (20) that screws or snaps onto the lid (10). The base (21) has an exit port (22) where the briquettes (15) are released. A pin is molded into the center of the bottom of the base (21) to position the carousel (60) in the center of the base (21) and elevate it off the bottom of the base (21) to reduce friction. There are four molded holes (80) around the top of the base (21) for holding the mounting screws.

The carousel (60) consists of eight chambers (65) which hold the briquettes (15). There are lightening holes (70) in between each chamber (65) to reduce the weight and cost of the carousel (65). In the bottom center of the carousel (60) is a small hole which positions the carousel (60) on a pin in the base (21). An axle is molded into the top center of the carousel (60). The axle is keyed to lock into the ratchet (50) and is held in place by a screw. The number, size and shape of the chambers (65) can be scaled to accommodate various types of solid mosquito control products. The unit could also be utilized for dispensing other objects not related to mosquito control.

A cover (45) is positioned between the lid (10) and base (21). The cover (45) provides mounting locations for all of the internal components and keeps the briquettes (15) in the carousel (60).

The control board (40) is wired to a radio receiver or the flight control system of the UAS. When the control board (40) receives a signal, it causes the servo (35) to rotate a set number of degrees and then return to its original position. The control board (40) regulates the speed and amount of travel of the servo (35). The rotation of the servo (35) is converted to a linear motion of the arm (55). The arm (55) rotates the ratchet (50) forward one cog. The pawl (30) holds the position of the ratchet (50) and prevents it from rotating backwards. The arm (55) and pawl (30) are held against the ratchet by springs. There is a momentary switch mounted on the lid (10) that is wired to the control board (40). It allows for manual activation of the servo (35) during loading or unloading of the chambers.

The battery (25) is a rechargeable lithium polymer battery but can be of any type. The unit can also be powered directly from the UAS power source to save weight. A power switch on the lid disconnects the battery when not in use.

In use, the rotary dispenser device is attached to the UAS by sliding the mount (5) into a mount (6) on the UAS. The signal wires are plugged into the radio receiver or flight control system.

The dispenser device is powered on by a switch on the lid of the unit. To load the unit, a briquette is dropped through the loading port into the carousel. Then a button is pressed to advance the carousel one position. This process is repeated until the carousel is full. The UAS can then be flown to the target areas. The drop locations can be pre-programmed so that the briquettes are released automatically according to GPS coordinates. The pilot can also release the briquettes manually by pressing a button on a radio transmitter. Manual release of the briquettes can be aided by a wireless video camera mounted below the base.

Example II

Linear Dispenser Device and Use Thereof

The rotary dispenser device described in Example I delivers tablets which are chambered in individual cells in a carousel. As the carousel spins, the tablets are dropped at a site of interest. The present inventors have also designed a linear dispenser device, where tablets are stacked vertically and released using a wiring system which is triggered by turning the UAS lights on and off.

Figure 3:
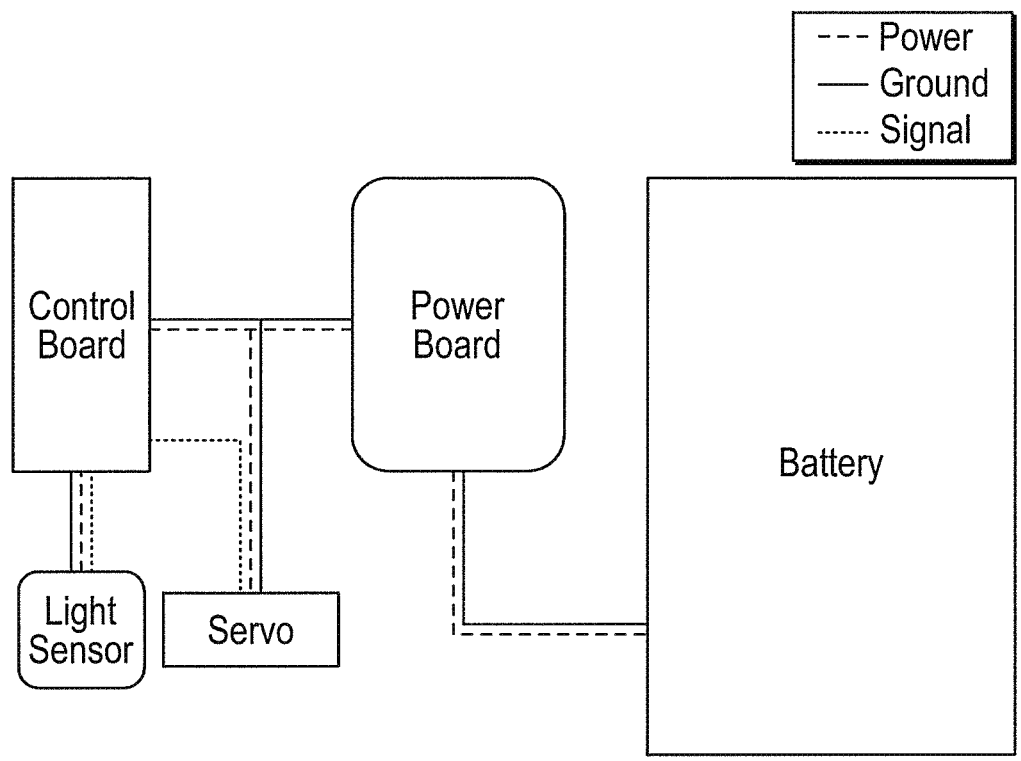
FIG. 3 is a wiring diagram for the linear dispenser device providing the means to dispense the tablets or briquettes by turning the lights on and off.

In this embodiment, the body (130) attaches by two clips (90) that snap onto the landing legs of the UAS. See FIGS. 2A-2D. In preferred embodiments, the DJI Phantom Quadcopter is employed. Holes in the clips (90) allow the use of pull ties to secure the unit. The arms (110) support the body (130) and the body houses the electronics. See FIG. 3. The lid (136) slides into the body (130) covering the electronics. There is a charge port (105) in the lid (136) that provides access to a USB connector. The hopper (120), e.g., a 50 ml centrifuge tube, or other cylindrical or shaped receptacle, screws into the body and holds up to 15 tablets (115). Other size hoppers can be fitted to hold different numbers of tablets. In certain embodiments, the tablets are fed into the body by gravity. In other embodiments, the tablets could be loaded using a spring loader.

The unit is operated by way of a light sensor (140). The opaque light cover (145) replaces the clear lens on the Phantom and positions the light sensor (140) directly below one of the front lights. In certain embodiments, instead of replacing the lens, the light cover could surround the lens eliminating the need to remove it. The light sensor (140) detects when the front lights of the Phantom are on or off. The lights are turned on and off by the remote control. Signals from the light sensor (140) are sent to the control board (150). The control board (150) runs the software that controls the unit. When the light is turned off, the control board (150) signals the servo (155) attached to the servo arm (156) to swing the shuttle (160) back allowing a tablet (115) to drop from the hopper (120). When the light is turned back on, the shuttle (160) moves forward, pushing the tablet (115) out of the mouth (135) of the unit.

The unit is powered by a rechargeable battery (165). The battery (165) connects to the power board (170). The power board (170) regulates the voltage from the battery (165) and charges the battery when connected to a USB charge adapter. Regulated voltage from the power board (170) powers the control board (150) and servo (155). There is an on/off switch (100) on the power board (170) to shut the system down when not in use. Indicator lights (95) on the control board (150) provide information on the power and charge status of the battery. The light sensor (140) is powered through the control board (150).

Figure 4A:
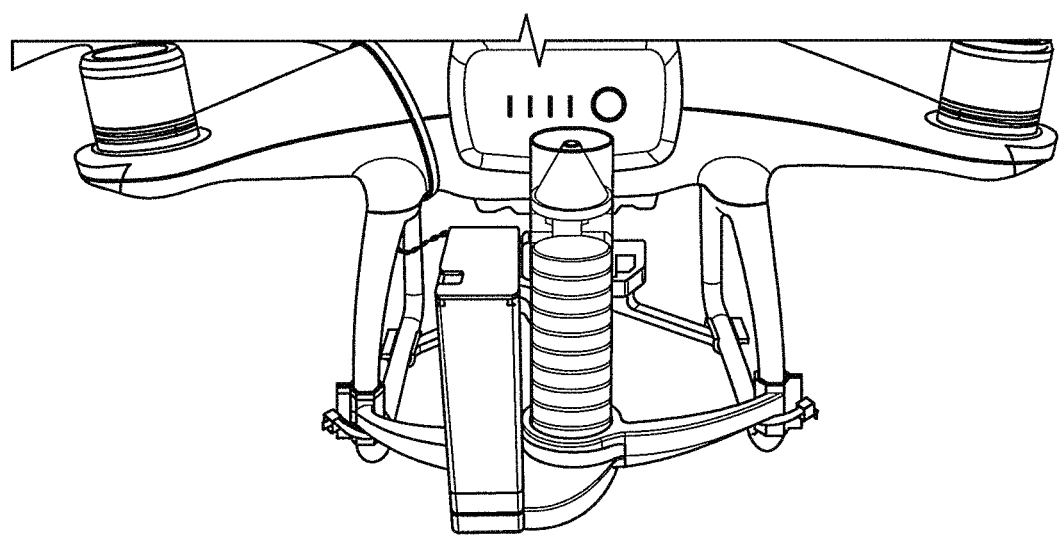
FIGS. 4A-4E are perspective views of different parts of a DJI Phantom 4 Quadcopter having a linear dispensing device mounted thereon.
Figure 4B:
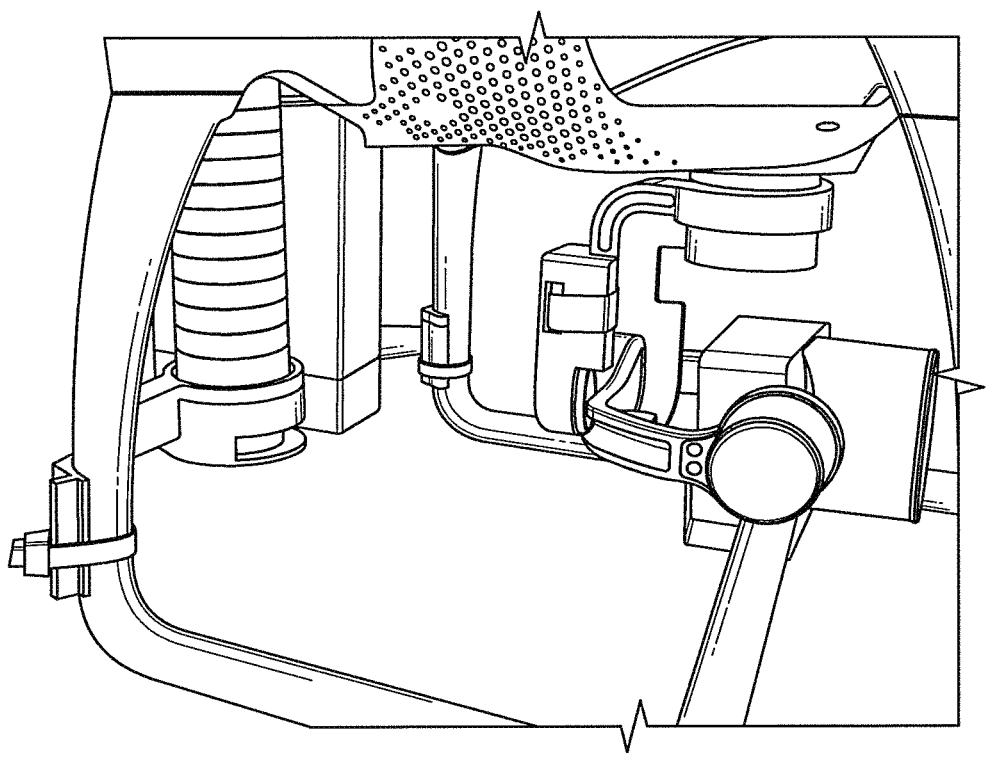
Figure 4C:
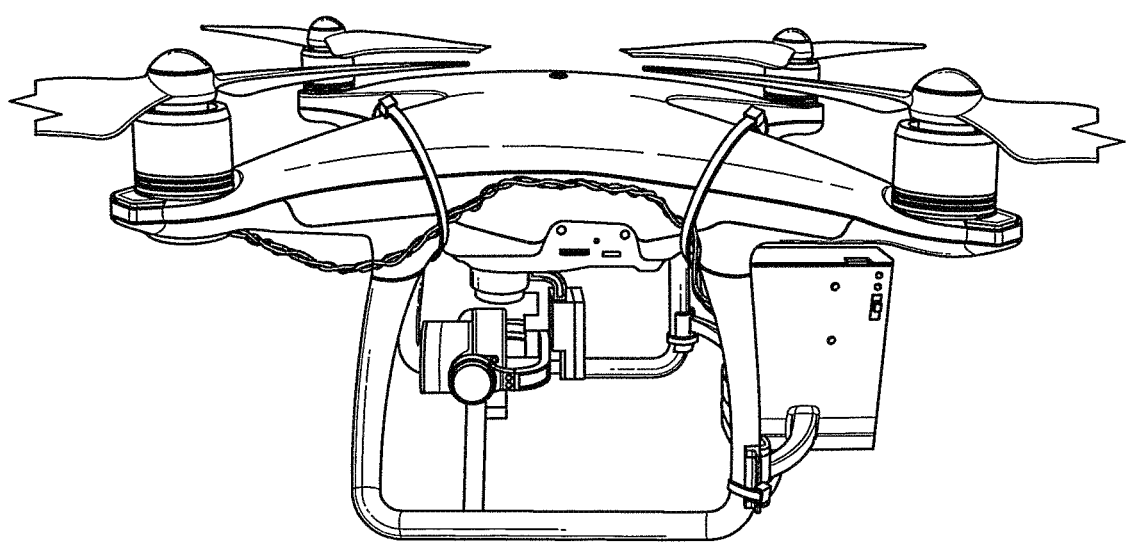
Figure 4D:
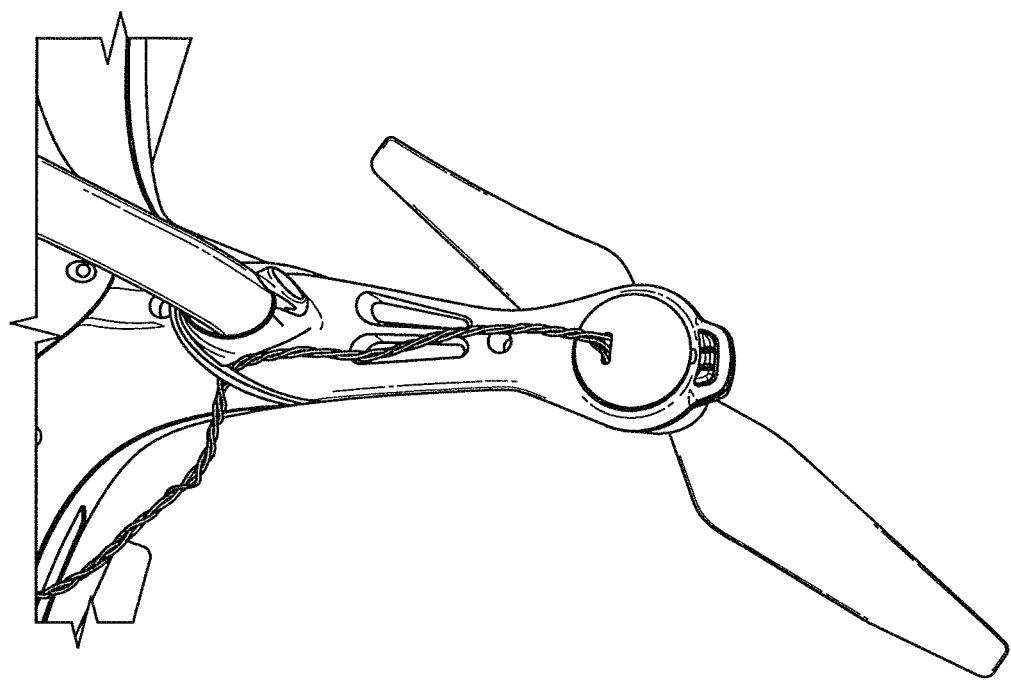
Figure 4E:
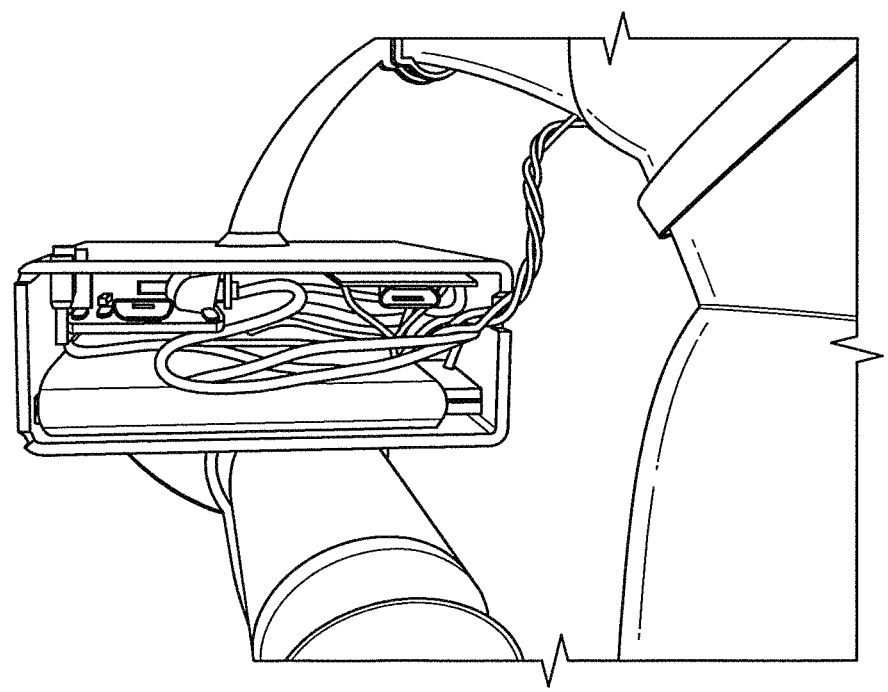

In use, the unit is attached to the landing legs of the Phantom by the clips (90). See FIGS. 4A-4C. One of the lenses on the front lights is removed and replaced by the light cover/sensor unit as shown in FIGS. 4D and 4E. One of the switches on the Phantom remote control is programmed in the flight control software to control the front lights. The unit is powered on after the Phantom is prepared for flight. The pilot uses the live video image from the Phantom camera to locate target areas. When near the area, the camera in tilted straight down to see what is below the Phantom. When directly over the target area, the front lights are turned off with the button on the remote control. This causes a tablet to drop into the mouth. The operator presses the button again to turn on the lights and the tablet is pushed out of the mouth. The video image informs the operator if the tablet landed in the intended location. The process is repeated until all of the target areas are treated or the unit runs out of tablets. The unit can be quickly reloaded by simply replacing the empty hopper with a full one. The unit is charged by plugging the power board into any 5V USB charger such as a cell phone charger or computer USB port. While the basic design of the linear dispenser device depicts a cylindrical hopper and round tablets, the unit can be modified to work with other size hoppers and shapes of tablets. For example, the hopper could be square in shape and the tablets cuboidal, to fit a hopper so configured.

While the described invention has been described with reference to the specific embodiments thereof, it should be understood by those skilled in the art that various changes may be made and equivalents may be substituted without departing from the true spirit and scope of the invention. In addition, many modifications may be made to adapt a particular situation, material, composition of matter, process, process step or steps, to the objective, spirit and scope of the described invention. All such modifications are intended to be within the scope of the claims appended hereto.

What is claimed is:

1. A rotary dispenser device for releasing one or more solid briquettes or tablets at a location of interest, comprising:
   a housing including a lid and a base;
   a carousel disposed within said housing;
   said lid having a loading port for loading the briquettes or tablets into said carousel and a mount at a top of said lid for mounting said housing to a corresponding mount on an unmanned aerial system (UAS) and said base having an exit port extending through a bottom wall of the base for egress of the briquettes or tablets, the briquettes or pellets comprising a larvicide which impairs mosquito breeding ability or is lethal to mosquitos; and
   a control board for receiving a signal triggering a servo to advance said carousel relative to said exit port so that at least one of the briquettes or tablets within the carousel is released from the housing through said exit port upon arrival of the UAS at the location of interest.

2. The rotary dispenser device of claim 1, wherein said control board is activated remotely.

3. A method for controlling insect or mosquito populations at locations of interest, comprising:
   filling a carousel within a rotary dispenser device with one or more briquettes or tablets comprising a larvicide which impairs mosquito breeding ability or is lethal to mosquitos, the rotary dispenser device having a housing including a lid and a base, the carousel being disposed within the housing, the lid having a loading port for loading the briquettes or tablets into the carousel and a mount for mounting the housing onto an unmanned aerial system (UAS), and the base having an exit port for egress of the briquettes or tablets, and the rotary dispenser device having a control board for receiving a signal triggering a servo to advance the carousel relative to the exit port so that at least one of the briquettes or tablets within the carousel is released from the housing through the exit port upon arrival of the UAS at a location of interest;
   mounting the rotary dispenser device to the UAS;
   flying the UAS to the location of interest; and
   activating the control board causing the servo to advance the carousel to cause at least one of the briquettes or tablets to fallout of the housing through the exit port at the location of interest thereby releasing the larvicide and controlling insect or mosquito populations at the location of interest.

4. A dispenser, comprising an unmanned aerial system (UAS) with a rotary dispenser device for releasing one or more solid briquettes or tablets at a location of interest, said rotary dispenser device comprising:

a housing including a lid and a base;

a carousel disposed within said housing;

said lid having a loading port for loading the briquettes or tablets into said carousel and a mount for mounting said housing onto the unmanned aerial system (UAS) and said base having an exit port for egress of the briquettes or tablets;

said lid being mounted to said UAS via the mount, and one or more briquettes or tablets being contained within said carousel, wherein said briquettes or tablets comprise a larvicide which impairs mosquito breeding ability or is lethal to mosquitos; and a control board for receiving a signal triggering a servo to advance said carousel relative to said exit port so that at least one of the briquettes or tablets within the carousel is released from the housing through said exit port upon arrival of the UAS at the location of interest.

5. The dispenser according to claim 4, wherein the UAS is a quadcopter.

6. A method, comprising:

remotely controlling flight of the UAS with the rotary dispenser device according to claim 4 to a location of interest; and remotely causing a briquette or tablet for controlling insect or mosquito populations to be released from the rotary dispensing device at the location of interest.

* * * * *